June 28, 1949.  R. T. EVANS ET AL  2,474,731
TWO-WAY PLOW
Filed May 5, 1945  2 Sheets-Sheet 2
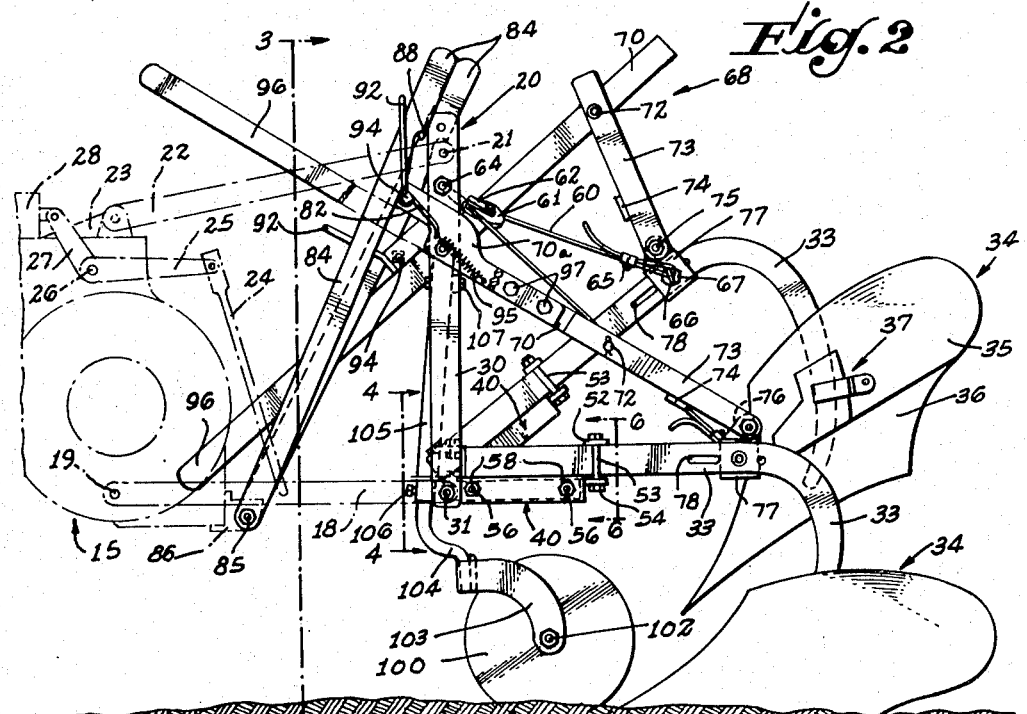
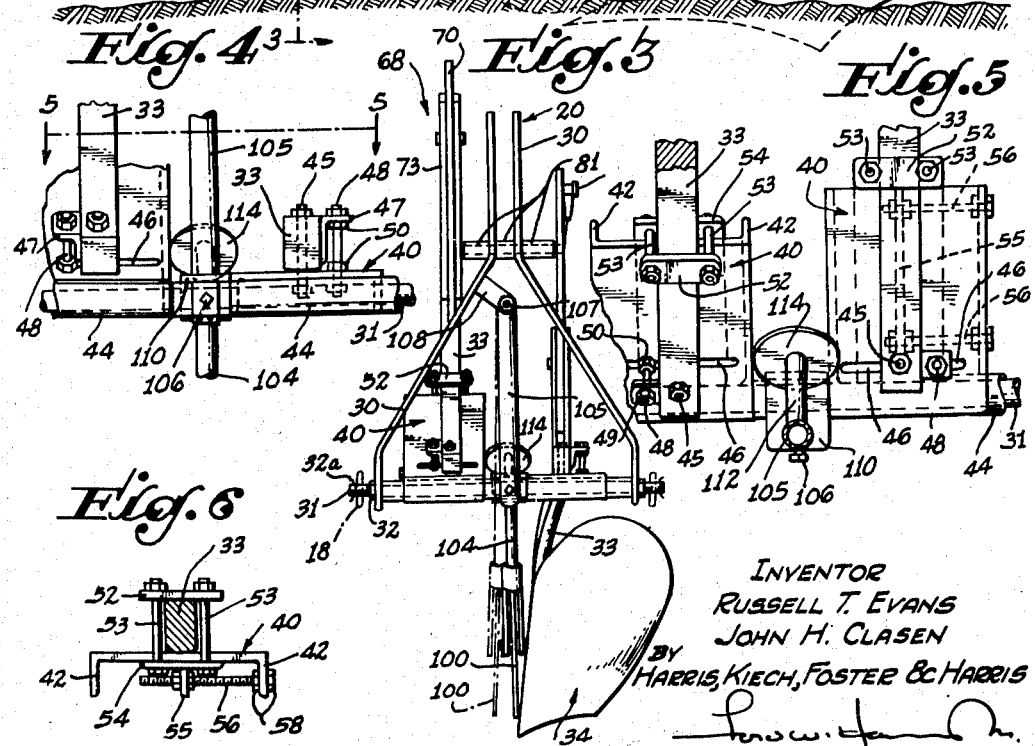
INVENTOR
RUSSELL T. EVANS
JOHN H. CLASEN
BY HARRIS, KIECH, FOSTER & HARRIS
FOR THE FIRM
ATTORNEYS Patented June 28, 1949

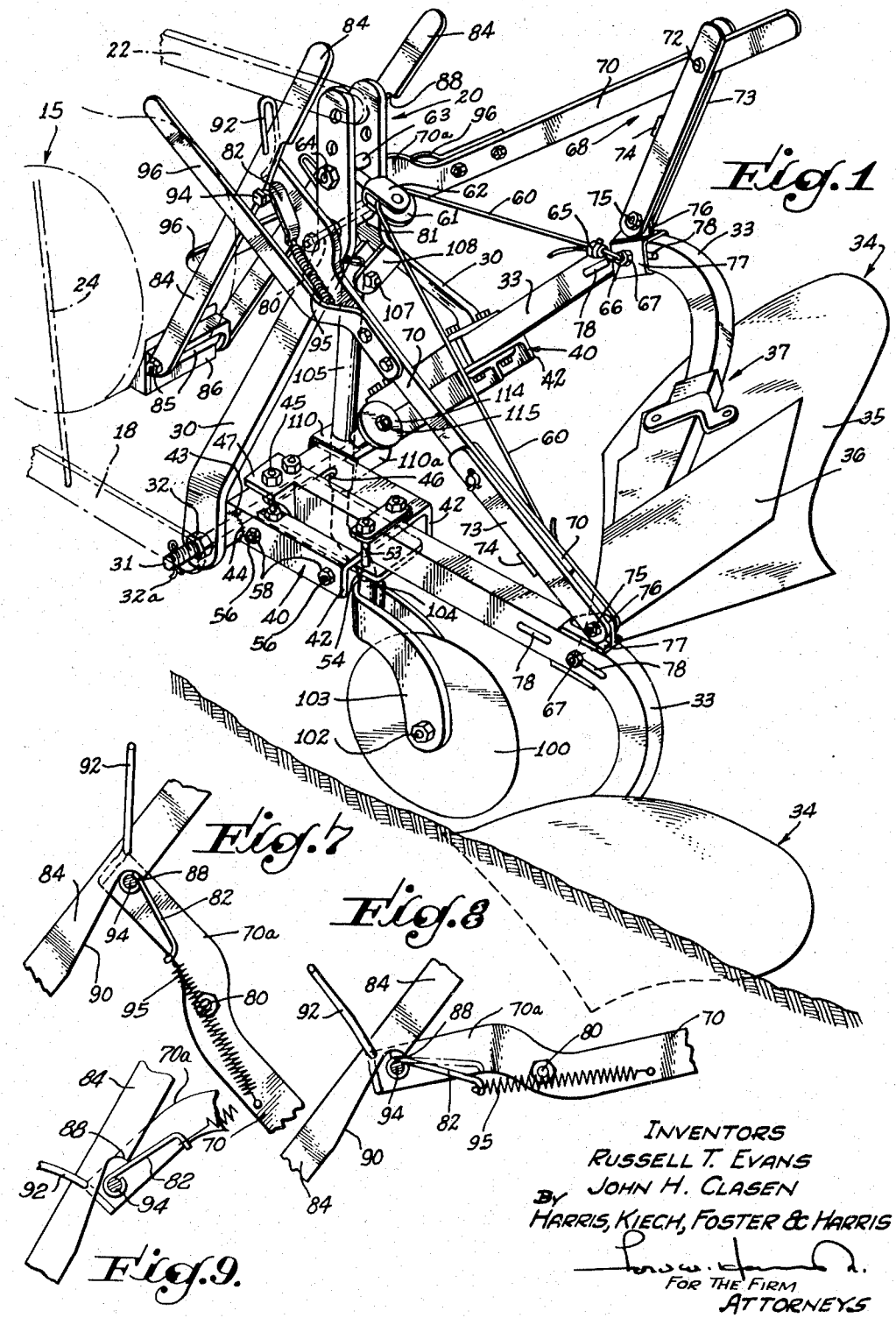

2,474,731

UNITED STATES PATENT OFFICE 2,474,731

TWO-WAY PLOW

Russell T. Evans and John H. Clasen, Anaheim, Calif., assignors to Alice Marian Mellen, Whittier, Calif.

Application May 5, 1945, Serial No. 592,104

17 Claims. (Cl. 97—29)

This invention relates to plow constructions in which two oppositely pitched plow bottoms are employed so that furrows may be turned in either direction with respect to the direction of travel of a vehicle by which the plow is drawn.

The general object of this invention is to improve two-way plow constructions in certain novel respects whereby to improve their efficiency and facilitate their use.

A particular object is to provide an improved construction for automatically raising and lowering the respective plow bottoms by means of power lift mechanism now commonly employed upon farm tractors.

It is a further object to provide improved automatically actuated mechanism by means of which interconnected plow bottoms may be selectively raised and lowered upon actuation by the mentioned automatic lift mechanism when a plow supporting frame is raised and lowered thereby for the purpose of bodily moving the two plows to and from plowing position.

It is a further object of the invention to provide trip means whereby the plow bottoms of the two-way plow may be automatically and alternately elevated by successive actuations of power lift mechanism by which the two-way plow is bodily lifted, such trip means being automatically disengaged from operative position by development of a predetermined spring-loading created by lifting movement. It is a further object of the invention to take advantage of the operation of gravity as a means of initiating the tripping function when the respective plow bottom is to be elevated.

According to a preferred embodiment of the invention, the colter-shifting device is in the form of a disk connected with the colter support and adapted to be engaged by a beam supporting one of the plow bottoms when the respective plow bottom is being lifted, whereby to shift the colter support toward a beam supporting the other plow bottom as the latter is being lowered. The automatic means for selectively raising and lowering the plow bottoms includes automatic tripping mechanisms connected with jointed levers by which the respective plow bottoms are raised into inoperative position and by which they are braced in plowing position when lowered. These trip mechanisms respectively include trip arms adapted to be movably mounted upon a fixed portion of a draft vehicle, each trip arm being provided with engaging means adapted to releasably engage a yielding detent on a lifting arm comprising one of the members of the respective jointed lever, the yielding detent being spring-controlled so as to be increasingly spring-loaded as the lifting arm changes position, the detent being automatically disengaged from the respective trip arm upon attainment of a predetermined maximum spring-load. Such maximum spring-load is accomplished when the respective lifting arm has approximately reached the limit of its elevating movement. Such elevating movement is accomplished by bodily elevation of the structure upon which the plow bottoms are carried.

Other objects and features of the invention will be apparent to those skilled in the art upon reference to the following specification and to the accompanying drawings wherein certain embodiments of the invention are disclosed for the purpose of illustration.

In these drawings,

Fig. 1 is a perspective view of a two-way plow embodying the features of the present invention, its general relationship to a tractor employing power lift mechanism being indicated in broken lines;

Fig. 2 is a side elevation corresponding with the perspective view of Fig. 1, the relation of the two-way plow construction and its automatic shift mechanism to a hydraulic power lift on the tractor being illustrated in greater detail;

Fig. 3 is a front elevation, taken approximately from the line 3—3 of Fig. 2, portions of the trip mechanism and the elevated plow being omitted for the purpose of clarity;

Fig. 4 is a detail, partly in front elevation and partly in vertical section, indicated approximately by the line 4—4 of Fig. 2;

Fig. 5 is a detailed plan view, taken from the line 5—5 of Fig. 4;

Fig. 6 is a detail of mounting and adjusting means for a plow beam, taken on the lines 6—6 of Fig. 2; and Figs. 7, 8 and 9 are fragmentary elevations indicating relative positions of the trip mechanism at different stages of actuation, Fig. 7 indicating the initial lifting relationship between a lifting arm and its trip arm, Fig. 8 indicating the final or kick off position of such trip arm at the end of the lifting operation, and Fig. 9 indicating the non-engaging and non-lifting relationship between the trip arm and lifting arm of a previously elevated plow bottom.

In the drawings the rear housing 15 of a tractor is represented in broken lines. To the opposite sides of the housing 15 two elevator arms 18 are pivoted at 19. The rearward ends of the arms 18 serve to support the lower end of an A-frame 20 whose upper end has connected thereto as by means of a bolt 21 a positioning arm 22, the forward end of which is connected with the tractor housing 15 through the medium of a part 23 which may be an automatic control conventionally employed on some tractors for adjustment of the A-frame 20 or similar framework in accordance with the pull or thrust imparted to the positioning arm 22 through the A-frame 20. The elevator arms 18 are controlled by means of elevator links 24 whose lower ends are connected respectively to intermediate portions of the arms 18 and whose upper ends are connected to the outer ends of a forked bell crank 25 pivoted on the housing 15 as by means of a rock shaft 26, an upper arm 27 of the bell crank 25 being connected with a hydraulic lift mechanism 28 under the control of the operator of the tractor.

The A-frame 20 comprises two bent side members 30 whose lower portions diverge to assume positions respectively adjacent the rear ends of the elevator arms 18, the members 30 of the A-frame 20 being supported on the arms 18 through the medium of a transverse shaft 31 extending through the adjacent extremities of the arms 18 and the members 30 and being conveniently retained as by nuts 32 and cotter keys 32a. The shaft 31 at the lower end of the A-frame 20 carries a pair of plow beams 33 in the form of I-beams whose lower ends are curved downward and support conventional plow bottoms 34 which, for convenience, are hereinafter called "plows" and which include the usual mold boards 35 and landsides 36, the plow as a whole being in each instance secured to its I-beam 33 by any appropriate attaching means 37.

The forward portion of each of the plow beams 33 is adjustably mounted upon the transverse shaft 31 through the medium of a bearing plate 40 provided with side flanges 42 whose forward ends are notched and welded at 43 to a corresponding sleeve 44 carried upon the shaft 31. The underside of each beam 33 is bound upon the top face of its bearing plate 40 through the medium of a series of bolts. One bolt 45 extends vertically through a corresponding bore in the end of the beam 33 and through a slot 46 in the plate 40, the tightening of this bolt 45 serving in part to retain the adjustment of the respective beam. In order to provide for a limited amount of lateral tilt of each beam 33, a lug 47 is welded to the outer side of the beam and this lug has a bolt 48 passed therethrough and also through the slot 46 in the plate 40. The slot 46 permits lateral adjustment of the beam 33 by loosening and sliding the bolts 45 and 48 therealong. In addition to such retaining nuts 49 as may be required at the ends of each bolt 48, nuts 50 are provided on intermediate portions of the respective bolt 48 and are bound against adjacent faces of the lug 47 and the plate 40 to act as positioning means for retaining the lug 47 in its properly tilted position with respect to the plate 40. To provide further for lateral adjustment of the beams 33 and binding the same in such adjusted position, a tie plate 52 is provided adjacent the rear end of each plate 40. Each tie plate 52 bears upon the top of its beam 33 and is bound thereto by means of bolts 53 disposed at opposite sides thereof. The lower ends of the bolts 53 pass through and are bound to a projecting portion of a binding plate 54 whose main length extends within the channel under the respective bearing plate 40 to underlie substantially the full length of the plate 40. The bolts 53 bind the adjacent end of the plate 54 against the rear end of the plate 40. At its forward end the binding plate 54 is apertured to receive the bolts 45 and 48 by which the forward portion of the plate 54 is bound to the forward portion of plate 40.

By the described mounting of each plow beam 33 on its bearing plate 40, the respective beam and its plow 34 may be moved laterally by loosening the bolts 45, 48 and 53 and adjusting the nuts 58 to shift the rods 56, web 55 and binding plate 54 as required, these bolts being then tightened to maintain the adjustment. Such shift of the bolts 45 and 48 takes place in the slot 46 in the forward end of the respective bearing plate 40, and adjustment of the nuts 49 and 50 on the bolt 48 with respect to the lug 47 provides such tip of the beam 33 as may be required.

For the purpose of lowering one of the plows 34 simultaneously with the raising of the other plow, a cable 60 is passed through a pulley 61 carried in a clevis 62 secured to a spacing sleeve 63 and supported by a cross-bolt 64 between the upper ends of the frame members 30. The ends of the cable 60 are secured by means of clamps 65 in eyes 66 fixed on the ends of bolts 67 carried by the beams 33 adjacent the upper ends of the curved portions which carry the plows 34. Adjustment of the length of the cable 60 is permitted by the clamps 65. Also, if desired to lower both plows 34 so that they may be used together for the purpose of ditching, the pulley 61 and the clevis 62 may be disconnected by removing the bolt 64, or the cable 60 may be disconnected from the pulley 61 by removing one of the clamps 65.

Means is provided for raising each of the plows 34, this means comprising a jointed lever 68 for each plow. Each lever comprises a lifting arm 70 which is connected by a pivot 72 to a link section 73 comprising two spaced links between the corresponding ends of which the lifting arm 70 is disposed. When a plow 34 is in plowing position, its jointed lever 68 assumes the straightened position illustrated in both Figs. 1 and 2, and in this position the respective lever 68 serves as a brace by reason of the fact that the lower end of the lifting arm 70 is moved slightly past its dead center position and engages a stop bar 74 welded to the underside of the links 73 and spanning the space between them. The lower ends of the links of each link section 73 are pivotally mounted by a pivot bolt 75 upon opposite sides of an ear 76 of a slidable bracket 77 carried on the rearward portion of the respective plow beam 33 and retained by the respective bolt 67 to which the flexible cable 60 is attached. The ear 76 maintains the properly spaced relationship of the two members of each link 73. For the purpose of adjustment to control the suck of each plow, that is, its penetration into the soil, each bracket 77 is adjustable along the respective plow beam 33 to any one of a series of positions represented by a series of openings or slots 78 in which the respective bolt 67 may be selectively placed in accordance with the amount of lowering to be permitted by the respective lever 68.

The upper or forward end of each lifting arm 70 is pivoted upon the upper portions of the A-frame 20 by means of a cross-pivot bolt 80 which passes through upper portions of the frame members 30, the lifting arms 70 and the frame members 30 being maintained in properly spaced relationship by short spacing sleeves 81.

The extremity of each lifting arm 70 beyond the pivot bolt 80 is provided with a trip cam or latch 82 adapted to cooperate with a corresponding trip arm 84 for actuating the respective lifting arm 70 under certain conditions. Each trip arm 84 is supported by means of a pivot bolt 85 upon a bracket 86 secured to a rear portion of the housing 15 of the tractor. The trip arms 84, which extend upward from the pivots 85, are so arranged that their free upper ends lean rearward under the influence of gravity whereby to maintain their rear edges in engagement with the forward end of the latches 82. In this manner the forward end of each latch 82 may travel in a path to engage a shoulder 88 provided at the top of a tapering notch 90 cut into the rear edge of the respective trip arm 84. To guard against possible displacement of the respective trip arms 84 from the indicated operative position, appropriate retaining loops 92 of a sufficiently rigid material are secured to the extremities of the lifting arms 70. Thus, as the trip arms 84 move within their loops 92, and as the A-frame 20 is raised and lowered, the arms 84 swing toward and away from the lifting arms 70.

The trip cam or latch 82 of each of the lifting arms 70 is in the form of a leaf whose forward end is wrapped around a stud pin 94 secured to the adjacent side of the end of the respective lifting arm 70, which end of the lever arm 70 is indicated at 70a and is offset upwardly for the purpose of avoiding contact with the underlying portion of the respective frame member 30 when the respective lifting arm is in plow-elevating position. The rearward extremity of the latch 82 has secured thereto one end of a tension spring 95 whose opposite end is secured to the lifting arm 70. The spring 95 is adapted to be tensioned by movement of the latch 82 under actuating influence of the respective trip arm 84 whereby the corresponding shoulder 88 may maintain its engagement with the latch 82 until such time as the spring 95 is tensioned sufficiently during movement of the parts to the position of Fig. 8 to jerk the latch 82 for dislodgment of the shoulder 88. When such dislodgment occurs, the retaining loop 92 prevents throw of the respective trip arm 84 to an inoperative position. Meanwhile, as the other plow 34 descends and causes the end 70a of the respective arm 70 to rise, the angular position of the respective latch 82, which position corresponds somewhat with the broken line position of Fig. 8, prevents operative engagement of the latch 82 by the respective shoulder 88 through deflection of such shoulder 88 so that such latch 82 may slide past its shoulder 88 and continue to rise.

It is at times desirable to move the lifting arm 70 manually, and for this purpose, each arm 70 has a laterally offset extension 96 attached thereto by bolts 97, the extremities of these extensions 96 being within the reach of the operator of the tractor and adapted to be depressed or elevated by him.

The present two-way plow construction is desirably provided with an auxiliary earth-cutting tool in the form of a trailing colter disk 100 which is carried on an axle 102 supported in a fork 103 secured as by welding to the lower end of a bracket 104 which is inserted into the lower end of a hollow supporting post 105 and secured therein as by a set screw 106. The upper end of the post 105 is mounted on a pivot bolt 107 supported in lugs 108 welded to an upper sloping portion of one of the members 30 of the A-frame 20. The colter disk 100 is adapted to be aligned approximately with the forward point of an operating plow 34 and to be shifted into alignment with the point of the other plow when the latter is lowered into operating position. For this purpose, the lower portion of the post 105, which lies forward of the shaft 31, is adapted to be shifted along the shaft 31, the positioning of this portion of the post 105 being accomplished by an angle plate 110 which is welded to the post 105 and overlies the shaft 31, a portion 110a depending on the side of the shaft 31 opposite from the post 105, that is, on the rear side of the shaft 31. To the upper face of the angle plate 110, there is welded an angularly disposed upwardly extending stud post 112. Rotatably carried upon a reduced upper end of the stud post 112 is a shifting disk 114, which acts as a cam, the disk 114 being retained as by a nut 115.

As illustrated in Figs. 4 and 5, the portion of each bearing plate 40 carrying the respective plow beam 33 projects somewhat beyond the corresponding plow beam 33. Advantage is taken of this spacing and the inset position of the web of the I-beam forming the beam 33 for automatic shifting of the colter disk 100.

The shifting disk 114 serves as a means by which to move the lower end of the post 105 laterally from side to side and thereby also shift the colter disk 100 accordingly, the shifting action being accomplished through the medium of the adjacent edges of the bearing plates 40 and adjacent sides of the I-beams 33. As illustrated in Figs. 4 and 5, the inner edges of the bearing plates 40 extend inwardly somewhat from the adjacent sides of the beams 33 so that rising and falling movements of the beams 33 and their plows 34 cause the edges of the plates 40 to engage the shifting disk 114 to move it laterally, together with the lower end of the post 105. Thus, as one beam 33 is elevated, the adjacent edge of the corresponding plate 40 engages the disk 114 and moves it toward the web of the opposite I-beam 33 which meanwhile has been lowered so that its plate 40 clears the disk 114 and permits the latter to be moved into engagement with the web of the respective I-beam. In this manner, as one plow 34 and its I-beam 33 and bearing plate 40 are elevated, that plate 40 moves the shifting disk 114, thereby shifting the lower end of the post 105 and the colter disk 100 so that the latter is aligned approximately with the point of the plow 34 which is being lowered, engagement of the shifting disk 114 with the edge of the bearing plate 40 which is being lowered serving as a stop for the colter-shifting movement.

*Operation*

In operating a two-way plow possessing the improvements of this invention, the plow beams 33 will have been adjusted upon their bearing plates 40 to provide proper lateral positioning of the plows 34 as heretofore described, and the lower ends of the link sections 73 of the jointed levers 68 will have been properly adjusted on the respective beams 33 by means of the respective brackets 77 and attaching bolts 67 to provide the required suck by the plows 34, the length of the cable 60 having been correspondingly adjusted by means of one of the clamps 65. When the plow and tractor reach plowing position in the field, the A-frame 20, together with the plows 34, is bodily lowered through the medium of the elevator arms 18 by actuation of the hydraulic lift mechanism 28 under control of the tractor operator. Under these conditions, one of the plows 34 will be placed in plowing position with the colter disk 100 in alignment with the point thereof, the other plow 34 being elevated. This relative position of the plows 34 is illustrated in Figs. 1 and 2, where the lowered plow 34 is braced by its jointed lever 68 and the other jointed lever 68 is in its collapsed lifting position, the cable 60 serving to hold the elevated plow 34 in elevated position with its weight counterbalanced by the lowered plow. Forward movement of the tractor causes a furrow to be thrown by the lowered plow.

When the tractor reaches the edge of the field being plowed, the tractor operator causes actuation of the hydraulic lift mechanism 28 whereby to cause the elevator arms 18 to lift the A-frame, 20, thus bodily lifting the plows 34 and pulling the lowered plow out of the soil. As this elevation of the A-frame 20 occurs, the forward rolled edges of the latches 82 ride up along the rear edges of the trip arms 84. When about three-fourths of the total elevation of A-frame 20 has taken place, the forward edge of the latch 82 on the lifting arm 70 of the lowered plow engages under the shoulder 88 provided by the notch 90 in the respective trip arm 84. The shoulder 88 is of such shape and length with respect to the shape and size of the forward end of the latch 82 and with respect to the center of the stud pin 94, as indicated in Fig. 7, that the point of the shoulder 88 engages the latch 82 so as to check the upward movement of the latch 82 and hence to check upward movement of the end 70a of the corresponding lifting arm 70.

As the lifting movement of the respective lifting arm 70 is commenced by the restraining influence of the respective trip arm 84, the bite of the point of the corresponding shoulder 88 tends to restrain rocking movement of the latch 82 upon its stud pin 94, thereby tending to retain the original relationship between the respective trip arm 84 and latch 82 during the time when the corresponding lifting arm 70 and its end 70a are being moved into the elevated position illustrated in Fig. 8. As the angle of the lifting arm 70 is changed with respect to the trip arm 84, the latch 82 being held against substantial change in position, the spring 95 is correspondingly tensioned, as indicated in Fig. 8, this tension steadily increasing until such a time that the tension of the spring 95 together with a limited amount of change in angular position of the latch 82 causes the latch 82 to be jerked into its original position with respect to its arm 70, such action disengaging the respective trip arm 84 and throwing it back against the retaining loop 92. This kick-out action occurs when the elevation of the A-frame 20 is substantially complete, a limited amount of additional A-frame movement being permitted by reason of the fact that the shoulder 88 in the resultant relative position will not accomplish lifting contact with the latch 82. By action of the cable 60, the previously elevated plow 34 will be lowered slowly in counterbalanced relationship with the plow 34 which has just been elevated. As this descending plow 34 moves downward and the end 70a of the respective lifting arm 70 moves upward during elevation of the A-frame 20, the sharper angular relationship of the respective latch 82, which will lie along the axis of its lifting arm 70, will be such with respect to the shoulder 88 on the corresponding trip arm 84 that such shoulder 88 will be deflected and slide off the forward end of the latch 82 and not accomplish a restraining and lifting engagement therewith. This last effect is indicated in Fig. 9.

Upon downward movement of the A-frame 20 to return it to operative position, the forward ends of both of the lifting arms 70 slide down the rear edges of the respective trip arms 84, the end of the arm 70 for the lowered plow riding down over the respective shoulder 88 and notch 90 to the initial position, as seen in Figs. 1 and 2, the depressed end of the lifting arm 70 of the elevated plow lying at a lower position with respect to its shoulder 88 and notch 90 under these conditions. The parts are thus restored to the normal position illustrated in Figs. 1 and 2, with the difference that the positions of the plow 34 have been reversed. Upon a subsequent upward excursion of the A-frame 20, the same operation of the parts as above-described takes place with the result that the relative positions of the plows 34 are again reversed. In this manner a field being plowed may be traversed back and forth, the furrows being thrown always in the same direction.

When desired to use the implement as a ditcher, the cable 60 may be disconnected by removal of one of the clamps 65, and both plows lowered. In order to avoid lifting of the plows 34 by the trip arms 84 when the A-frame 20 is being elevated for bodily upward movement of the entire plow structure, the trip arms 84 are held out of operative engagement with the latches 82 in any desired manner.

As the respective plow beams 33 and their bearing plates 40 rise and fall, the inner edges of the plates 40 drive the shifting cam disk 114 whereby to shift the lower end of the colter-supporting post 105 and move the colter disk 100 into alignment with the lowered plow.

Since many variations of the improvements herein disclosed will become apparent to those skilled in the art, it is intended to cover such modifications as fall within the scope of the appended claims.

We claim as our invention:

1. In combination in a plowing structure: a frame; means to lift said frame; a plow movably carried on said frame; a lifting arm for said plow connected with said plow and movably mounted on said frame; trip means having a shoulder with respect to which said frame is movable; movable latch means on said arm comprising a leaf member one end of which is adapted to engage with said shoulder of said trip means; and tensionable means controlling said latch means and connected with the other end of said leaf member and adapted to jerk said leaf member into position to disengage the latter from said trip means upon development of predetermined tension in said tensionable means.

2. In combination in a two-way plow structure: a frame; a pair of oppositely pitched plows movably carried by said frame and interconnected to be selectively and simultaneously respectively lowered and raised to and from operative positions; means to move said frame; lifting means for each of said plows supported on said frame and respectively connected with said plows; trip means associated with each of said lifting means and adapted to actuate said lifting means to raise and lower the respective plows selectively; relatively movable tensioned means connected with each of said lifting means and adapted for engagement with the respective trip means to cause the latter to actuate the respective lifting means when the respective plow is in a lowered position; and tensioning spring means for each lifting means connected with said tensioned means and adapted to be tensioned by actuation of said lifting means to push the respective trip means away from said tensioned means upon development of predetermined tension in said tensioning spring means.

3. A combination according to claim 2 including means to move said frame vertically whereby to actuate a lifting means engaged with its respective trip means.

4. In combination in a two-way plow: a frame; a pair of oppositely pitched plows movably mounted on said frame and interconnected, whereby one plow is simultaneously lowered as the other is raised; lifting arms respectively connected with said plows and pivoted upon said frame to raise said plows selectively upon said frame; means to lift said frame and plows bodily; trips retained against substantial movement in the direction of lift of said frame and adapted to engage and actuate said lifting arms respectively upon lift of said frame, said trips being adapted to swing to engage and disengage said arms; means under tension to kick said trips respectively out of engagement with said lifting arms upon attainment of a predetermined relation between said arms and said trips; and means to produce and increase said tension as said predetermined relation is approached.

5. A combination as in claim 4 wherein said trips are upstanding trip arms having notches providing shoulders on their rear edges, and said means under tension are latch means carried respectively by said lifting arms in position to engage under said shoulders.

6. A combination as in claim 4 wherein said trips are upstanding trip arms having notches providing shoulders on upstanding edges thereof to cooperate with said means under tension, said means under tension being latch means carried respectively by said lifting arms in position to engage under said shoulders in one angular position of said arms and to shift said shoulders from such engagement in another angular position of said arms.

7. A combination as in claim 4 wherein said trips are upstanding trip arms having notches providing shoulders on their rear edges, and said means under tension are latch means carried respectively by said lifting arms in position to engage under said shoulders, said means to increase said tension being springs connected with said latch means to be increasingly tensioned by pressure of said shoulders on said latch means as said frame is lifted.

8. A combination as in claim 4 wherein said means under tension comprises a movable cam for each lifting arm, each arm being adapted to be so positioned when a plow is being lowered as to avoid lifting engagement of the respective trip with the respective lifting arm.

9. In combination in a two-way plow: a frame to be lifted bodily; a pair of oppositely pitched plows movably mounted on said frame to be lifted therewith and interconnected whereby one plow is simultaneously lowered as the other is raised; lifting arms respectively connected with said plows and pivoted upon said frame to raise said plows selectively upon said frame; trip means disposed in substantially upright position and adapted to engage and actuate said lifting arms respectively upon lift of said frame, said trip means being movable toward and away from said lifting arms; tensioned yielding means presenting lifting and deflecting surface means positioned to cooperate with said trip means and move said trip means away from said lifting arms and out of position for lifting connection with said lifting arms upon attainment of predetermined relationships between said arms and said trip means; and tensioning means to place said tensioned yielding means under tension.

10. A combination as in claim 9 wherein said tensioned yielding means are disposed on said arms at an angle with respect to said trip means when said arms are in one predetermined angular relationship with respect to said trip means so that said trip means engage said tensioned means to actuate said arms as said arms are lifted by said frame, and wherein said tensioned means are disposed at a relatively sharp angle with respect to said trip means when said arms and trip means are in a second predetermined angular relationship so that said tensioned means displace said trip means from arm-engaging position.

11. A combination as in claim 10 wherein said tensioned means yield to retain engagement of said trip means with said arms while initially in said one angular relationship, the tension of said tensioning means increasing as said tensioned means yield to displace said trip means from engagement with said arms as a third predetermined angular relationship is attained.

12. In combination in a two-way plow: a frame adapted to be lifted bodily; oppositely pitched plow means movably mounted on said frame to be lifted bodily therewith and interconnected whereby one plow means is lowered simultaneously with the raising of the other plow means; a pair of lifting arm members respectively connected with said plow means and pivoted upon said frame to raise said plow means selectively upon said frame; a pair of trip members adapted to be mounted against substantial movement in the direction of lift of said frame and positioned to engage and actuate said lifting arm members respectively and selectively upon lift of said frame and to move to and from position for lifting connection with said lifting arm members, parts of one of said pairs of members having engaging means including tensioned deflecting surface means, and parts of the other of said pairs of members having cooperating engaging means adapted and positioned for deflection thereof by said deflecting surface means from position for lifting connection with said lifting arm members upon attainment of a predetermined angular relationship between the respective lifting arm members and trip members; and means tensioning said deflecting surface means.

13. A combination as in claim 12 wherein said tensioned deflecting surface means yield for lifting engagement between said engaging means and said cooperating engaging means, as said frame is lifted, upon attainment of a different angular relationship between the respective trip members and lifting arm members.

14. In combination in a two-way plow: a frame; a pair of oppositely pitched plows movably mounted on said frame and interconnected, whereby one plow is simultaneously lowered as the other is raised; lifting arms respectively connected with said plows and pivoted upon said frame to raise said plows selectively upon said frame; means to lift said frame and plows bodily; trip means adapted to engage and actuate said lifting arms respectively upon lift of said frame, said trip means being movable to and from arm engaging position; and cam means for each lifting arm and adapted for engagement with the respective trip means, each cam means being movable with its arm into one angular position as its plow is raised, whereby to deflect the respective trip means from engaging position as said frame is raised, and each cam means being movable with its arm into another angular position as its plow is lowered, whereby its arm is adapted to assume a position such that it will be engaged by the respective trip means to lift the respective plow as said frame is again raised.

15. A combination as in claim 14 including tensioning means for each cam means to provide for limited yielding movement of such cam means upon engagement by said trip means.

16. A combination as in claim 15 wherein said tensioning means includes resilient means whose tension increases with increasing relative movement of said cam means with respect to said trip means, whereby to dislodge the respective trip means as a predetermined position of said frame is reached.

17. A combination as in claim 14 wherein each cam means and its arm are movable on said frame to assume a different angular relationship with respect to their trip means as said frame approaches the limit of its lift, whereby such trip means becomes disengaged from the respective cam means by reason of the change in angularity.

RUSSELL T. EVANS.
JOHN H. CLASEN.

REFERENCES CITED

The following references are of record in the file of this patent:

UNITED STATES PATENTS

| Number | Name | Date |
|---|---|---|
| 267,630 | Witt | Nov. 14, 1882 |
| 1,303,427 | Wallace | May 13, 1919 |
| 2,187,380 | Kaltoft | Jan. 16, 1940 |
| 2,249,861 | Silver | July 22, 1941 |
| 2,256,039 | Axtell | Sept. 16, 1941 |
| 2,339,468 | Ego | Jan. 18, 1944 |
| 2,354,084 | Geraldson | July 18, 1944 |
| 2,401,837 | Mellen et al. | June 11, 1946 |